United States Patent Office 3,711,269
Patented Jan. 16, 1973

3,711,269
PROCESS FOR MANUFACTURING LIQUID
FERTILIZER
William T. Curless, Overland Park, Kans., assignor to
Willchemco, Inc., Tulsa, Okla.
No Drawing. Filed Sept. 17, 1970, Ser. No. 73,215
Int. Cl. C05b 7/00
U.S. Cl. 71—36       5 Claims

ABSTRACT OF THE DISCLOSURE

A clear liquid potassium ammonium phosphate fertilizer of relatively high potassium content is manufactured by ammoniating a potassium acid phosphate solution to a specific ratio and then filtering the ammoniated solution at a temperature within a very narrow range so as to remove precipitated solids. By adhering to the preferred limitations of composition and temperature the production of unstable triammonium phosphate as a byproduct is avoided and liquid fertilizer with $P_2O_5$ to $K_2O$ weight ratios of about 1 to 1.5 may be obtained.

DESCRIPTION OF THE INVENTION

In recent years the use of fluid fertilizer compositions in the form of both suspensions and clear liquid solutions has exhibited rapid growth. More than one-fourth of all the fertilizer consumed in the United States is now fluid and the use of this type of product is still increasing. One of the difficulties encountered in producing clear liquid fertilizers is the lack of suitable processes for making such fertilizers having a high potassium content. For the growth of some crops and particularly for maximum production of sugar, so that certain vegetables have better flavor, it is necessary to use fertilizers of high potassium content.

In general, clear liquid fertilizers are made by dissolving ammonium nitrate and urea in water and adding thereto various other soluble phosphates and potassium salts. The potassium salts are normally potassium chloride and potassium sulfate. The range of compositions which can be made is rather limited. For example, the potassium content of commercially available clear liquid fertilizer is no more than 10% by weight expressed as $K_2O$.

There is a particularly high demand for fertilizer in which the $K_2O$ analysis is from about one-half to about the same as the $P_2O_5$ analysis. In 1967, of the eight leading grades of clear liquid fertilizers which contained potassium six had an equal ratio by weight of $K_2O$ to $P_2O_5$.

The invention disclosed herein permits an economical means for preparation of clear liquid fertilizer of high potassium content at $P_2O_5$ to $K_2O$ weight ratios between about 1.5 and 1. For example, clear liquid fertilizers stable at 25° C. with $P_2O_5$ and $K_2O$ contents of about 23% and 15.5% or about 27% and 27% respectively by weight may be prepared by this method. In addition, from 2 to 3% N is also present in these liquids, making them complete fertilizers.

It is convenient to produce a potassium acid phosphate product from phosphoric acid and potassium chloride so as to have a fertilizer blending ingredient of high potassium and phosphorus content. It would be desirable to use this material in combination with ammonia to produce potassium ammonium phosphate fertilizers in fluid form if it were possible to hold the desired ingredients in solution. Production in this way involves the conduction of phase reactions in a system containing ammonium phosphate, potassium phosphate and water. Some studies have been made of systems of this type. It is fair to say that the prior literature has revealed complex behavior and a number of unsolved problems in systems of this type. A study by Bergman et al., Zhur. Prikl. Khim. 40, No. 8, 1838–41 (1967) reveals that disubstituted potassium and ammonium phosphates have different hydration behavior and do not form continuous solid solutions. Their eutectic temperature is quite low, about −18° C. It is the difference in hydration behavior and the transition from one hydrate to another at different temperatures by both of these compounds which renders the phase behavior extremely complicated, so that results are virtually impossible to predict.

Askenasy and coworkers in German Pat. 540,077 claim a process for the simultaneous production of dipotassium phosphate and triammonium phosphate in which monopotassium phosphate is treated with ammonia in such a way that the $K_2O$ to $P_2O_5$ ratio is 2:1 and the solution containing the dipotassium phosphate is separated from the solid triammonium phosphate. The production of triammonium phosphate is advantageous in that it is a single substance rather than a mixture. However, triammonium phosphate is unstable, continuously liberating ammonia on standing. Thus, its production involves waste of ammonia unless it is immediately converted into another product which utilizes a part of the ammonia. In the preferred embodiments of the present process the production of unstable triammonium phosphate is avoided and there is obtained a precipitated ammonium phosphate by-product which needs only to be dried and packaged, to be marketed as a stable fertilizer product.

One of the classic studies in this field of physical chemistry is that of Jänecke et al. in Z. Phys. Chem. Leipzig 127, 71–92 (1927). This study explores the quaternary system $K_2O$—$NH_3$—$P_2O_5$—$H_2O$ at 0° and 25° C. Separation phenomena are disclosed between 0° and 70° C. By separation phenomena the author appears to mean the separation of the liquid phase into two immiscible liquids in this system under conditions which are somewhat more alkaline than those used in the process of this invention. This separation of liquid phases is an interesting and unique phenomenon but is not employed in the present process. It is illustrative of the strange and variable behavior of the system at various temperatures and concentration ranges. This reference does not suggest the process claimed herein.

According to the procedure of this invention, by observing rather narrowly defined limitations of concentrations and temperature, it is feasible to manufacture a clear liquid solution of ammonium potassium phosphate of high potassium content, useful in the liquid fertilizer art, and at the same time to precipitate a useful, stable, solid product consisting essentially of ammonium phosphate which is readily dried and utilized as a fertilizer and is substantially free of triammonium phosphate. The method comprises the following steps:

(a) preparing an aqueous solution of potassium phosphate and phosphoric acid in which the water to potassium weight ratio lies between 1 and 4 and in which the ratio $$\frac{\text{moles } (K^+)}{\text{moles } (PO_4^\equiv)}$$

is between 0.5 and 1,
(b) ammoniating the solution from step (a) until the ratio $$\frac{\text{moles } (K^+) + \text{moles } (NH_4^+)}{\text{moles } (PO_4^\equiv)}$$

in the liquid phase is approximately 2, preferably 1.9 to 2.0, then (c) filtering the ammoniated solution at a temperature between 20 and 40° C. to remove precipitated solids leaving a liquid fertilizer containing from 2 to about 3% N, having a $P_2O_5$ to $K_2O$ weight ratio from about 1 to 1.5 and containing between 23 and 34% phosphorus expressed as $P_2O_5$ and between 15 and 32% potassium expressed as $K_2O$.

Another specific embodiment of the subject invention includes the method of producing a clear liquid fertilizer which comprises the following steps:

(a) preparing an aqueous solution of potassium phosphate and phosphoric acid in which the water to potassium weight ratio lies between 1 and 2 and in which the ratio $$\frac{\text{moles } (K^+)}{\text{moles } (PO_4^\equiv)}$$

lies between 0.5 and 1, (b) ammoniating the solution from step (a) until the ratio $$\frac{\text{moles } (K^+) + \text{moles } (NH_4^+)}{\text{moles } (PO_4^\equiv)}$$

in the reaction mixture is between 1.9 and about 2, and then (c) filtering the ammoniated solution at a temperature of between 25 and 35° C. to remove precipitated solids leaving a liquid fertilizer containing from 2 to about 3% N, having a $P_2O_5$ to $K_2O$ weight ratio of about 1, and containing between 25 and 31% $P_2O_5$ and between 25 and 32% $K_2O$.

A further specific embodiment of the subject invention includes the method of producing a clear liquid fertilizer by the following steps:

(a) preparing an aqueous solution of potassium phosphate and phosphoric acid in which the water to potassium weight ratio lies between 3.3 and 3.9 and in which the ratio $$\frac{\text{moles } (K^+)}{\text{moles } (PO_4^\equiv)}$$

is between 0.5 and 0.8, (b) ammoniating the solution from step (a) until the ratio $$\frac{\text{moles } (K^+) + \text{moles } (NH_4^+)}{\text{moles } (PO_4^\equiv)}$$

in the reaction mixture is between 1.9 and about 2, and then, (c) filtering the ammoniated solution at a temperature between 25 and 35° C. to remove precipitated solids leaving a liquid fertilizer containing from 2 to about 3% N, having a $P_2O_5$ to $K_2O$ weight ratio of about 1.5 and containing between 21 and 25% $P_2O_5$ and between 14 and 17% $K_2O$.

In a preferred embodiment of the invention an aqueous solution of potassium phosphate having a K to P mole ratio of between 0.5 to 0.8 and having a weight ratio of $H_2O$ to K between 1.1 and 1.4 is ammoniated to the equivalent of a mixture of diammonium phosphate and dipotassium phosphate; that is until the ratio $$\frac{\text{moles } (K^+) + \text{moles } (NH_4^+)}{\text{moles } (PO_4^\equiv)}$$

in the reaction mixture is 2. The slurry which then forms is filtered or centrifuged at a temperature between 25 and 35° C. to remove solid diammonium phosphate, leaving a filtrate which may be used directly as a high-analysis, clear liquid fertilizer. If desired, the solution may be diluted slightly to prevent crystallization in storage during cold weather. A portion of the filtrate may be recycled in the process to decrease the solids content of the slurry and reduce the load on the filtration or centrifuging system.

The filtration temperature is quite important. If a temperature appreciably above 40° C. is used, a solid solution containing both dipotassium and diammonium phosphate begins to form and decreases the yield of potassium content in the liquid fertilizer filtrate. This undesirable result increases in severity as the temperature increases and, for example, at 55° C. separations yielding liquid fertilizers having $P_2O_5$ to $K_2O$ weight ratios of 1.5 are barely possible. If the temperature is maintained below about 20° C., there is not only a necessity for refrigeration, which involves considerable expense, but the solid product derived from the filtration step is a diammonium phosphate dihydrate material which cannot be satisfactorily dried for use as a solid fertilizer.

If the potassium acid phosphate fed to the process is derived from the reaction of potassium chloride with phosphoric acid, about 2 to 3% chloride ion can be tolerated as an impurity without affecting the process appreciably. The solid product obtained by filtration in the present process contains some adherent mother liquor. It is desirable to wash or recrystallize this product so as to eliminate potassium ion if a very pure grade of diammonium phosphate is desired. In the following examples the practice of this invention is illustrated by the production of liquid ammonium potassium phosphate fertilizer of various ratios of fertilizer ingredients while at the same time producing a solid consisting essentially of diammonium phosphate as a valuable by-product. Parts given are parts by weight.

EXAMPLE 1

A mixture of 46.8 parts $KH_2PO_4 \cdot H_3PO_4$ and 9.4 parts water was reacted with 10.2 parts of anhydrous ammonia gas and the resulting slurry was equilibrated at 35° C. for 1 hour. Filtration yielded 36.4 parts of a solid ammonium phosphate and 29.5 parts of a liquid fertilizer having a N—$P_2O_5$—$K_2O$ composition of 2–30–31.5.

EXAMPLE 2

A total of 188 parts of solvent containing 184.2 parts water and 3.8 parts of $H_3PO_4$ was mixed with 936 parts of $KH_2PO_4 \cdot H_3PO_4$. To this slurry 204 parts of anhydrous ammonia was added, which was sufficient to theoretically convert the $KH_2PO_4 \cdot H_3PO_4$ to a mixture of $K_2HPO_4$ and $(NH_4)_2HPO_4$. After equilibration at 35° C., the slurry was filtered, removing, when corrected for adherent mother liquor, 730 parts of solid diammonium phosphate and leaving a liquid fertilizer having a N—$P_2O_5$—$K_2O$ composition of 2–30–31.5.

EXAMPLE 3

A mixture of potassium phosphates having a P to K mole ratio of 1.3 was prepared. A solution of 202.5 parts of this material was made with 50 parts of water and equilibrated at 40° C. after addition of 34.1 parts of anhydrous ammonia. The slurry was filtered to yield, on correction for adherent mother liquor, 115 parts of solid diammonium phosphate containing a small amount of potassium and 170 parts of a liquid fertilizer analyzing 2–30–30 as N—$P_2O_5$—$K_2O$.

EXAMPLE 4

A solution of 46.8 parts of $KH_2PO_4 \cdot H_3PO_4$ was made with 12.9 parts of water and 10.2 parts of anhydrous ammonia was then added. The resulting slurry was agitated at 20° C. for 2 hours and centrifuged to remove, after correction for adherent mother liquor, 35.7 parts of solid diammonium phosphate. The filtrate which remained and the adherent mother liquor from the solid product weighed a total of 34.2 parts and when calculated as N—$P_2O_5$—$K_2O$ was shown to consist of a 2–27–27 liquid fertilizer.

EXAMPLE 5

A mixture of 46.8 parts $KH_2PO_4 \cdot H_3PO_4$, 11.0 parts $NH_3$ and 10.3 parts $H_2O$ was prepared. The slurry was agitated at 30° C. for 2 hours and filtered. After correction for adherent mother liquor, the 37.8 parts of solid which had been removed analyzed 22.5% N and 23.0% P. This is equivalent to a mixture of 30.8 parts diammonium phosphate and 7 parts triammonium phosphate. The filtrate analysis when calculated as N—$P_2O_5$—$K_2O$ was equivalent to a 2–28–31 liquid fertilizer.

EXAMPLE 6

A mixture of 46.8 parts $KH_2PO_4 \cdot H_3PO_4$, 5 parts water and 35.2 parts concentrated ammonium hydroxide containing 29% $NH_3$ was prepared and agitated at 25° C. for 3 hours. On filtration and correction for adherent mother liquor 26.8 parts of solid diammonium phosphate was removed, leaving 60.2 parts of filtrate having a N—$P_2O_5$—$K_2O$ analysis of 2.7–23–15.5.

EXAMPLE 7

A mixture of 46.8 parts $KH_2PO_4 \cdot H_3PO_4$ and 14.2 parts water was treated with 10.2 parts of anhydrous ammonia. The slurry was agitated for 2 hours at 35° C. after which centrifugation removed, after correction for adherent mother liquor, 33.6 parts of solid diammonium phosphate leaving 37.6 parts of a liquid fertilizer having a N—$P_2O_5$—$K_2O$ analysis of 3–27.5–25.

EXAMPLE 8

A mixture of 272 parts of $KH_2PO_4$ and 95 parts of water was treated with 34 parts of anhydrous ammonia. The slurry was agitated for 1 hour at 30° C. in a stirred reaction vessel after which it was centrifuged in a 5 inch diameter basket at 4000 r.p.m. The damp solid which was removed when corrected for adherent mother liquor amounted to 104 parts and was shown on analysis to be diammonium phosphate. The filtrate was suitable for use as a liquid fertilizer and analyzed approximately 2–29–31 as N—$P_2O_5$—$K_2O$.

EXAMPLE 9

A recycle liquor-ammonia mixture was prepared from 14.5 parts diammonium phosphate, 415.2 parts dipotassium phosphate trihydrate, 3 parts sodium chloride and 71.7 parts concentrated ammonium hydroxide analyzing 29% $NH_3$. To this mixture was added 100 parts of the reaction product of fertilizer grade potassium chloride and wet process phosphoric acid. This reaction product analyzed 25.2% total phosphorus, 14.4% orthophosphate, 15.8% potassium, and 0.1% chloride. The total mixture was placed in a stirred reactor maintained at a constant temperature of 69° C. The slurry was agitated overnight at this temperature to hydrolyze the condensed phosphates and the resulting slurry was then cooled to 25° C. for 1 hour before being centrifuged through a polyethylene filter cloth. The damp solid was removed from the centrifuge and analyzed without washing or drying. Analysis of the damp solid which contained considerable adherent mother liquor was 10% N, 41.7% $P_2O_5$ and 18.9% $K_2O$. The filtrate analyzed 2.9% N, 33.7% $P_2O_5$ and 27.2% $K_2O$.

EXAMPLE 10

A total of 94.6 parts of recycle liquor from a previous experiment and 42.7 parts of the potassium chloride-phosphoric acid reaction product used in Example 9 were placed in a stirred reactor. The recycle liquor analyzed 2.9% ammoniacal nitrogen, 13.5% phosphorus, 20.1% potassium and 0.4% chloride. A vessel containing 8.9 parts of anhydrous ammonia at Dry Ice temperature was connected to the reactor. The anhydrous ammonia was allowed to warm and was thereby distilled into the reactor and was absorbed in the reaction mixture. The slurry was agitated overnight at 60° C. and then was cooled to 25° C. over a 1 to 2 hour period. After agitating at 25° C. for an additional hour, the slurry was centrifuged three times through a polyethylene filter cloth, using a basket centrifuge cooled by an ice-water mixture by means of coils surrounding the centrifuge. Portions of this centrifugate and the solid were analyzed. Direct analysis of the damp solid was 13.7% N, 44.2% $P_2O_5$ and 10% $K_2O$. The filtrate analyzed 2.6% N, 30.8% $P_2O_5$ and 28.1% $K_2O$.

Each example given above illustrates a number of points. Some of these points are given below. Examples 1, 2, 5, 6, 7, 8, 9 and 10 are within the preferred temperature range. Examples 3 and 4 illustrate the upper end of the preferred ratio of $$\frac{\text{moles }(K^+) + \text{moles }(NH_4^+)}{\text{moles }(PO_4^\equiv)}$$

Example 5 illustrates the undesirable precipitation of triammonium phosphate when too much ammonia is added. Example 2 illustrates the low end of the preferred ratio of $$\frac{\text{moles }(K^+) + \text{moles }(NH_4^+)}{\text{moles }(PO_4^\equiv)}$$

Examples 1 through 5, 7, 8 and 10 illustrate liquid fertilizer products having $P_2O_5$ to $K_2O$ weight ratios of approximately 1 while Example 6 illustrates product having a weight ratio of 1.5 and Example 9 illustrates product having a weight ratio of 1.25. Examples 9 and 10 illustrate solid products having adherent mother liquor remaining and they also illustrate both the use of recycle liquor and fertilizer grade chemicals. Feed to Examples 1, 4, 5, 6, 7, 9 and 10 has a $P_2O_5$ to $K_2O$ weight ratio of 3 while Example 3 has a 2 weight ratio and Example 8 has a 0.75 weight ratio. Water to potassium weight ratio varies from 1.06 in Example 3 to 1.67 in Example 4 and 3.84 in Example 6.

I claim:
1. The method of manufacturing a clear liquid fertilizer of high potassium and phosphorous content comprising the steps:
  (a) preparing an aqueous solution of potassium phosphate and phosphoric acid in which the water to potassium weight ratio lies between 1 and 4 and in which the ratio

$$\frac{\text{moles }(K^+)}{\text{moles }(PO_4^\equiv)}$$

lies between 0.5 and 1,
  (b) ammoniating the solution from step (a) until the ratio $$\frac{\text{moles }(K^+ + \text{moles})(NH_4^+)}{\text{moles }(PO_4^\equiv)}$$

in the reaction mixture is approximately 2; and then
  (c) separating precipitated solids from the reaction mixture from step (b) while maintaining said mixture at a temperature between 20 and 40° C. thereby leaving a liquid fertilizer containing between 2 and about 3% N and having a $P_2O_5$ to $K_2O$ weight ratio between about 1 and 1.5 and containing between 23 and 34% phosphorus expressed as $P_2O_5$ and between 15 and 32% potassium expressed as $K_2O$.
2. The method of claim 1 wherein the precipitated solids are separated by filtering said reaction mixture maintained at a temperature between 20 and 40° C.
3. The method of claim 1 in which the water to potassium weight ratio lies between 1 and 2 and in which the ratio $$\frac{\text{moles }(K^+)}{\text{moles }(PO_4^\equiv)}$$

lies between 0.5 and 1, the ammoniation being carried out until the ratio $$\frac{\text{moles }(K^+) + \text{moles }(NH_4^+)}{\text{moles }(PO_4^\equiv)}$$

in the reaction mixture is between 1.9 and about 2 and after removal of precipitated solids at a temperature between 25 and 35° C., the liquid fertilizer produced has a $P_2O_5$ to $K_2O$ weight ratio of about 1 and contains between 2 and 3% N, between 25 and 31% $P_2O_5$ and between 25 and 32% $K_2O$.

4. The method of claim 1 in which the water to potassium weight ratio lies between 3.3 and 3.9 and in which the ratio $$\frac{\text{moles } (K^+)}{\text{moles } (PO_4^\equiv)}$$

lies between 0.5 and 0.8 the ammoniation being carried out until the ratio $$\frac{\text{moles } (K^+) + \text{moles } (NH_4^+)}{\text{moles } (PO_4^\equiv)}$$

in the reaction mixture is between 1.9 and about 2 and after removal of precipitated solids at a temperature between 25 and 35° C., the liquid fertilizer produced has a $P_2O_5$ to $K_2O$ weight ratio of about 1.5 and contains between 2 and 3% N, between 21 and 25% $P_2O_5$ and between 14 and 17% $K_2O$.

5. The method of manufacturing a clear liquid fertilizer product of high potassium and phosphorous content, and solid diammonium phosphate by-product comprising:
(a) preparing an aqueous solution of potassium phosphate and phosphoric acid in which the water to potassium weight ratio lies between 1 and 4 and in which the ratio $$\frac{\text{moles } (K^+)}{\text{moles } (PO_4^\equiv)}$$

lies between 0.5 and 1;
(b) ammoniating the solution from step (a) until the ratio $$\frac{\text{moles } (K^+) + \text{moles } (NH_4^+)}{\text{moles } (PO_4^\equiv)}$$

in the reaction mixture is approximately 2; and then
(c) allowing the reaction mixture from step (b) to equilibrate at a temperature of between 20 and 40° C. and separating the precipitated solids therefrom which consist essentially of diammonium phosphate while maintaining said reaction mixture at said temperature to leave a liquid fertilizer containing between 2 and about 3% N and having a $P_2O_5$ to $K_2O$ weight ratio between about 1 and 1.5 and containing between 23 and 34% phosphorous expressed as $P_2O_5$ and between 15 and 32% potassium expressed as $K_2O$.

References Cited

UNITED STATES PATENTS

| 3,547,615 | 12/1970 | Beekham | 71—36 X |
| 2,083,652 | 6/1937 | Kaselitz | 23—107 X |
| 3,421,847 | 1/1969 | Such et al. | 23—107 |
| 3,347,656 | 10/1967 | Potts et al. | 71—36 |

FOREIGN PATENTS

| 448,808 | 1/1935 | England. |

OTHER REFERENCES

Liquid Fertilizer Manual, Chapter 18, Solubility and Salting Out, published by NFSA, received by P.O. November 1968, pp. 18-1–18-10.

REUBEN FRIEDMAN, Primary Examiner

R. BARNES, Assistant Examiner

U.S. Cl. X.R.

23—107, 302; 71—64 C